(12) United States Patent
Son (10) Patent No.: US 8,253,699 B2
(45) Date of Patent: Aug. 28, 2012

(54) DISPLAY APPARATUS, METHOD OF DRIVING THE SAME, AND SENSING DRIVER OF DISPLAY APPARATUS

(75) Inventor: Sun-Kyu Son, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1234 days.

(21) Appl. No.: 12/029,703

(22) Filed: Feb. 12, 2008

(65) Prior Publication Data

US 2009/0002312 A1 Jan. 1, 2009

(30) Foreign Application Priority Data

Jun. 28, 2007 (KR) ........................ 10-2007-0064579

(51) Int. Cl.
*G06F 3/041* (2006.01)
*G06F 3/033* (2006.01)
*G09G 3/18* (2006.01)
*G09G 3/36* (2006.01)

(52) U.S. Cl. ........ 345/173; 345/179; 345/100; 345/104; 345/174; 178/18.01; 178/18.03; 178/18.05; 178/18.06

(58) Field of Classification Search .............. 345/50–52, 345/55, 87, 104, 173, 179, 100, 174; 178/18.01, 178/19.01, 19.04, 18.03, 18.05–18.07; 349/160
See application file for complete search history.

(56) References Cited

U.S. PATENT DOCUMENTS 7,071,912 B2 * 7/2006 Zhang et al. .................. 345/100

2004/0155871 A1 * 8/2004 Perski et al. .................. 345/174
2004/0217934 A1   11/2004 Yang
2005/0266595 A1   12/2005 Lee
2006/0109222 A1 * 5/2006 Lee et al. ......................... 345/88
2006/0262099 A1 * 11/2006 Destura et al. ................ 345/173

FOREIGN PATENT DOCUMENTS

| JP | 11-133877 | 5/1999 |
| JP | 2004-334170 | 11/2004 |
| JP | 2005-346053 | 12/2005 |
| KR | 1019990037433 | 5/1999 |
| KR | 10-0587641 | 6/2006 |
| KR | 10-0675636 | 1/2007 |

* cited by examiner

*Primary Examiner* — Lun-Yi Lao
*Assistant Examiner* — Jarurat Suteerawongsa
(74) *Attorney, Agent, or Firm* — Cantor Colburn LLP (57) ABSTRACT

In a display apparatus, a display panel includes touch sensors that make contact with a common electrode by an external pressure to output a common voltage, and a sensing driver receives the common voltage from the touch sensors to generate a sensing signal. A controller receives the sensing signal from the sensing driver and calculates position information to which the external pressure is applied based on the sensing signal. The sensing driver includes a switching circuit that receives a switching signal from the controller to switch the common voltage. Thus, the display apparatus prevents the common voltage from being input during a period where a voltage level of the common voltage is abnormally high, thereby preventing a logic circuit of the sensing driver from being damaged.

17 Claims, 6 Drawing Sheets

DISPLAY APPARATUS, METHOD OF DRIVING THE SAME, AND SENSING DRIVER OF DISPLAY APPARATUS

This application claims priority to Korean Patent Application No. 2007-64579, filed on Jun. 28, 2007, and all the benefits accruing therefrom under 35 U.S.C. §119, the contents of which in its entirety are herein incorporated by reference.

BACKGROUND OF THE INVENTION

1. Field of the Invention

The present invention relates to a display apparatus, a method of driving the display apparatus, and a sensing driver of the display apparatus. More particularly, the present invention relates to a display apparatus including a display panel in which touch sensors are installed, a method of driving the display apparatus, and a sensing driver of the display apparatus.

2. Description of the Related Art

In general, a touch panel is arranged on top of an image display device and directly makes contact with a human hand or any other object, so that the human hand or the other object selects commands displayed on the image display device. The image display device having the touch panel detects a contact position through the touch panel and recognizes the command generated on the contact position as an input signal to perform its operation corresponding to the command.

The image display device having the touch panel has been widely used since it does not require additional input devices, such as a keyboard and a mouse that are connected to the image display device to drive the image display device.

Recently, the touch panel has been employed in a liquid crystal display ("LCD"). In this case, the touch panel is arranged on top of an LCD panel and receives a certain input from a user to detect position information. However, when the touch panel is provided separately from the LCD panel, optical characteristics of the LCD, such as brightness, viewing angle, etc., are deteriorated, and a total thickness of the LCD increases by a thickness of the touch panel added to the LCD panel.

BRIEF SUMMARY OF THE INVENTION

The present invention provides a display apparatus having a display panel in which a touch sensor is installed and prevents damage of a sensing driver connected to the touch sensor.

The present invention also provides a method of driving the display apparatus.

The present invention also provides a sensing driver of the display apparatus.

In exemplary embodiments of the present invention, a display apparatus includes a display panel, a pixel driver, a sensing driver, and a controller.

The display panel includes a common electrode receiving a common voltage, pixels facing the common electrode and displaying an image in response to driving signals, and touch sensors arranged adjacent to the pixels and making contact with the common electrode by an external pressure to output the common voltage.

The pixel driver is electrically connected to the pixels to provide the driving signals to the pixels, and the sensing driver is electrically connected to the touch sensors to receive the common voltage from the touch sensors and generate a sensing signal based on the common voltage. The sensing driver includes a switching circuit which receives a switching signal from the controller to switch the common voltage and a sensing signal generating circuit which generates the sensing signal based on the common voltage output from the switching circuit.

The controller may control a drive of the pixel driver, receive the sensing signal from the sensing driver, and output position information to which the external pressure is applied based on the sensing signal.

In other exemplary embodiments of the present invention, a method of driving a display apparatus includes displaying an image in response to a gate signal and a data signal, outputting a common voltage in response to a pressure provided from an exterior, switching the common voltage in response to a switching signal, calculating position information to which the pressure is applied based on the common voltage that is selectively provided in response to the switching signal, and controlling the gate signal and the data signal to perform an operation corresponding to the position information.

In still other exemplary embodiments of the present invention, a sensing driver of a display apparatus, where the sensing driver is arranged to be electrically connected to touch sensors of the display apparatus and to receive a common voltage from the touch sensors, includes a switching circuit including transistors which receive a switching signal to selectively output the common voltage, and a sensing signal generating circuit including transistors which generate a sensing signal based on the common voltage output from the switching circuit. The transistors within the switching circuit are enabled to endure a greater voltage level than the transistors within the sensing signal generating circuit.

According to the above, the sensing driver includes the switching circuit that receives the switching signal from the controller to switch the common voltage. Thus, the switching circuit may block the common voltage during the period where the voltage level of the common voltage is abnormally high, thereby preventing the logic circuit of the sensing driver from becoming damaged.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Hereinafter, exemplary embodiments of the present invention will be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the thickness of layers, films, and regions are exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the invention.

Hereinafter, the present invention will be described in detail with reference to the accompanying drawings.

Figure 1:
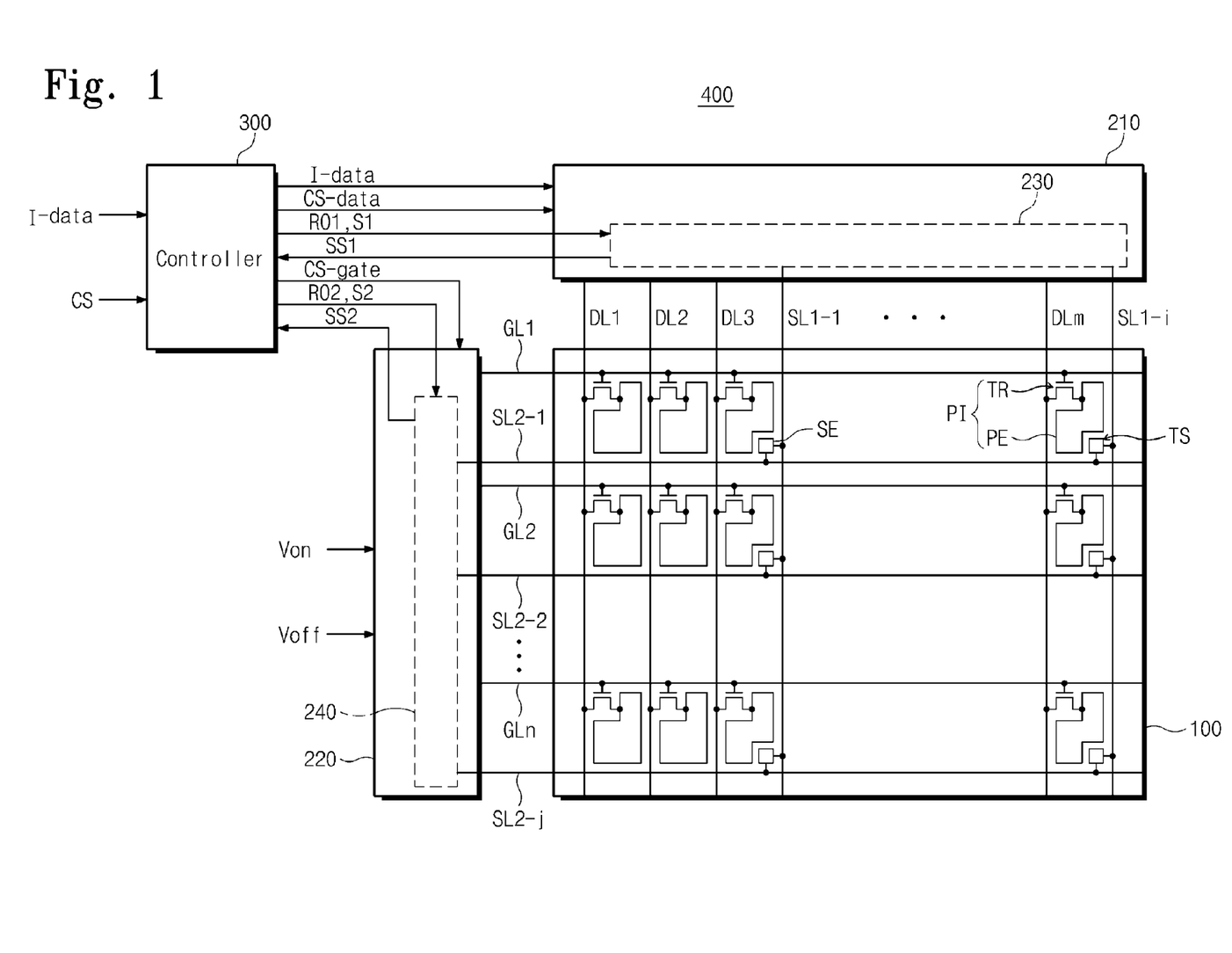
FIG. 1 is a diagrammatic plan view showing an exemplary embodiment of a display apparatus according to the present invention.

FIG. 1 is a plan view showing an exemplary embodiment of a display apparatus according to the present invention.

Referring to FIG. 1, a display apparatus 400 includes a display panel 100, a data driver integrated circuit ("IC") 210, a gate driver IC 220, and a controller 300.

The display panel 100 includes a plurality of pixels PI and a plurality of touch sensors TS. The pixels PI include a plurality of data lines DL1~DLm, a plurality of gate lines GL1~GLn, a plurality of thin film transistors ("TFTs") Tr, and a plurality of pixel electrodes PE. Particularly, the data lines DL1~DLm are extended in a first direction and the gate lines GL1~GLn are extended in a second direction that is substantially perpendicular to the first direction. The data lines DL1~DLm are insulated from and intersected with the gate lines GL1~GLn.

The data lines DL1~DLm are electrically connected to the data driver IC 210 to receive a data signal, and the gate lines GL1~GLn are electrically connected to the gate driver IC 220 to sequentially receive a gate signal.

Each TFT Tr is electrically connected to a corresponding gate line GL and a corresponding data line DL to receive the data signal in response to the gate signal. Each pixel electrode PE is electrically connected to an output terminal of a corresponding TFT Tr to receive the data signal.

Although not shown in FIG. 1, the display panel 100 further includes a common electrode that faces the pixel electrodes PE and receives a common voltage Vcom from an exterior and a liquid crystal layer interposed between the pixel electrodes PE and the common electrode. Thus, when the data signal is applied to the pixel electrodes PE, an electric field is generated between the common electrode and the pixel electrodes PE. As a result, the display apparatus 400 controls a light transmittance of the liquid crystal layer using an intensity of the electric field, thereby displaying a desired image thereon. The common electrode and the liquid crystal layer, which are not illustrated in FIG. 1, will be described in detail later with reference to FIG. 5.

The touch sensors TS include a plurality of first sensing lines SL1-1~SL1-$i$, a plurality of second sensing lines SL2-1~SL2-$i$, and a plurality of sensing electrodes SE. The first sensing lines SL1-1~SL1-$i$ are extended in parallel with the data lines DL1~DLm and electrically connected to a first sensing driver 230 installed within the data driver IC 210. The second sensing lines SL2-1~SL2-$i$ are extended in parallel with the gate lines GL1~GLn and electrically connected to a second sensing driver 240 installed within the gate driver IC 220. Each sensing electrode SE is electrically connected to a corresponding first sensing line SL1 and a corresponding second sensing line SL2.

As an example of the present invention, a structure where each touch sensor TS is arranged at every three pixels PI has been shown in FIG. 1. However, in alternative exemplary embodiments, the touch sensors TS may be arranged more closely with each other than those of FIG. 1 in order to increase a touch sensitivity, or may be arranged more sparsely than those of FIG. 1 in order to improve an opening ratio, such as an aperture ratio, of the display apparatus 400.

When an external pressure is provided to the display panel 100, at least one sensing electrode SE corresponding to a region to which the external pressure is applied among the sensing electrodes SE may make contact with the common electrode. Thus, the common voltage Vcom applied to the common electrode is applied to the at least one sensing electrode SE that makes contact with the common electrode. The common voltage Vcom applied to the at least one sensing electrode SE is provided to the first and second sensing drivers 230 and 240 through corresponding first and second sensing lines SL1 and SL2, respectively.

The controller 300 receives an image data I-data and various control signals CS from an exterior. The controller 300 changes the various control signals CS to generate a data control signal CS-data and a gate control signal CS-gate. The controller 300 transmits the data control signal CS-data and the image data I-data to the data driver IC 210 and transmits the gate control signal CS-gate to the gate driver IC 220.

The data driver IC 210 changes the image data I-data to the data signal in response to the data control signal CS-data and outputs the data signal to the data lines DL1~DLm. The gate driver IC 220 outputs a first driving voltage Von or a second driving voltage Voff to the gate lines GL1~GLn as the gate signal in response to the gate control signal CS-gate.

Also, the controller 300 generates a first readout signal RO1, a second readout signal RO2, a first switching signal S1, and a second switching signal S2 based on the various control signals CS input to the controller 300. The first readout signal RO1 and the first switching signal S1 are provided to the first sensing driver 230 installed within the data driver IC 210, and the second readout signal RO2 and the second switching signal S2 are provided to the second sensing driver 240 installed within the gate driver IC 220.

At an initial state, the first and second sensing drivers 230 and 240 output a reference voltage Vref to the first and second sensing lines SL1-1~SL1-$i$ and SL2-1~SL2-$i$, respectively, and thus the first and second sensing lines SL1-1~SL1-$i$ and SL2-1~SL2-$i$ are reset. Then, when at least one touch sensor TS among the touch sensors TS makes contact with the common electrode by the external pressure and receives the common voltage Vcom, the first and second sensing drivers 230 and 240 receive the common voltage Vcom from the touch sensor TS that makes contact with the common electrode.

The first and second sensing drivers 230 and 240 select a period during which the common voltage Vcom from the touch sensor TS is input in response to the first and second switching signals S1 and S2, respectively. That is, the first and second sensing drivers 230 and 240 receive the common voltage Vcom during a first period where the common voltage Vcom is in a range of a normal voltage level and block the input of the common voltage Vcom during a second period where the common voltage is out of a range of the normal voltage level in response to the first and second switching signals S1 and S2, respectively. Thus, the common voltage Vcom having an abnormally high or low voltage level may be prevented from being applied to the first and second sensing drivers 230 and 240, thereby preventing a logic circuit of the first and second sensing drivers 230 and 240 from becoming damaged.

The first sensing driver 230 generates a first sensing signal SS1 having information of an x-axis coordinate value among position coordinates with respect to the touch sensor TS that makes contact with the common electrode based on the common voltage Vcom in the range of the normal voltage level. Also, the second sensing driver 240 generates a second sensing signal SS2 having information of a y-axis coordinate value among the position coordinates with respect to the touch sensor TS based on the common voltage Vcom in the range of the normal voltage level.

The first and second sensing signals SS1 and SS2 respectively generated from the first and second sensing drivers 230 and 240 are provided to the controller 300. The controller 300 generates a position coordinate of a contact position to which the external pressure is applied (that is, the region where the touch sensor TS makes contact with the common electrode) based on the first and second sensing signals SS1 and SS2 from the first and second sensing drivers 230 and 240, and controls the gate driver IC 210 and the data driver IC 220 in order to perform an operation corresponding to the contact position.

In an exemplary embodiment, the first and second sensing drivers 230 and 240 may have the same or substantially the same circuit configuration. Accordingly, a circuit configuration of the first sensing driver 230 will be described in detail with reference to FIG. 2, and a detailed description of the second sensing driver 240 will be omitted in order to avoid redundancy.

Figure 2:
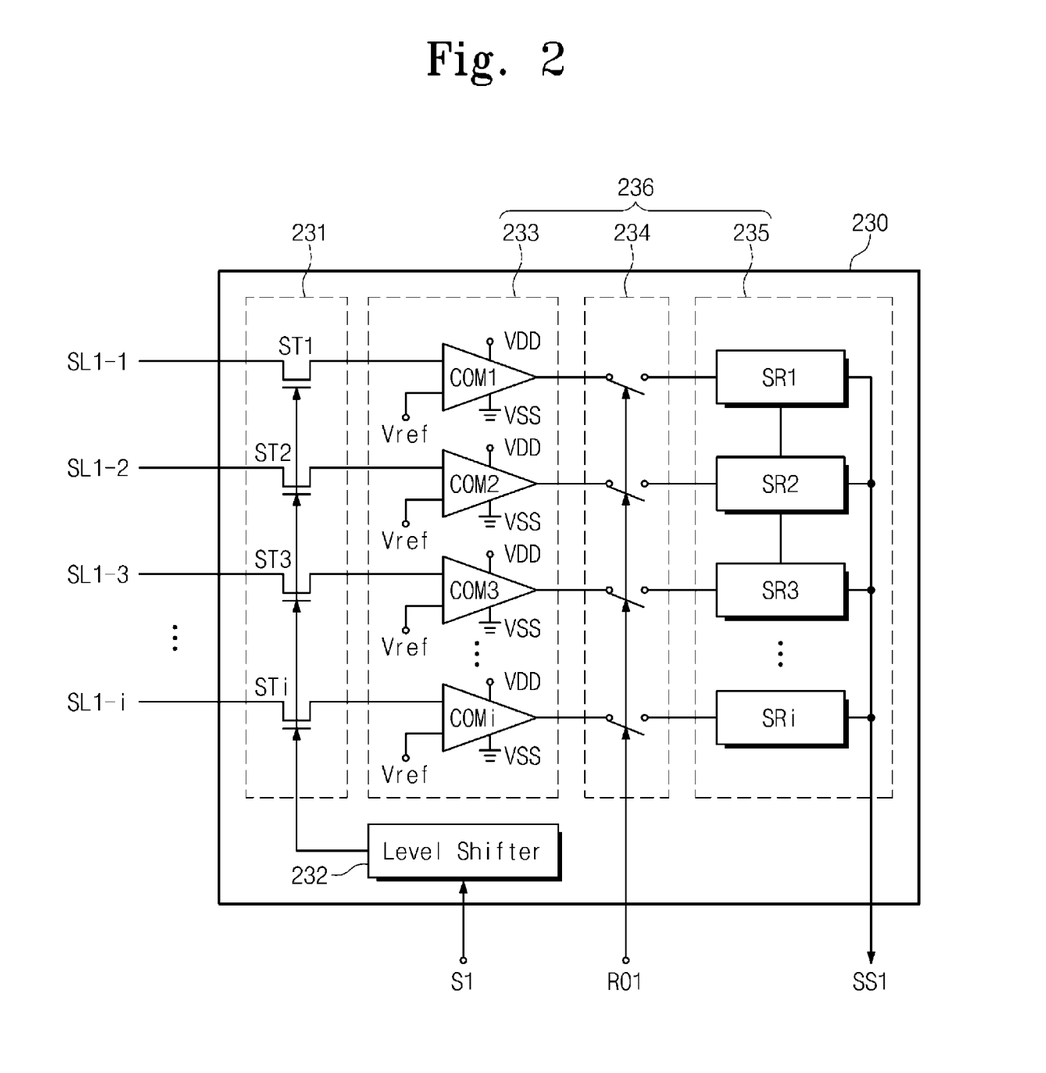
FIG. 2 is a block diagram showing an exemplary first sensing driver of FIG. 1.
Figure 3:
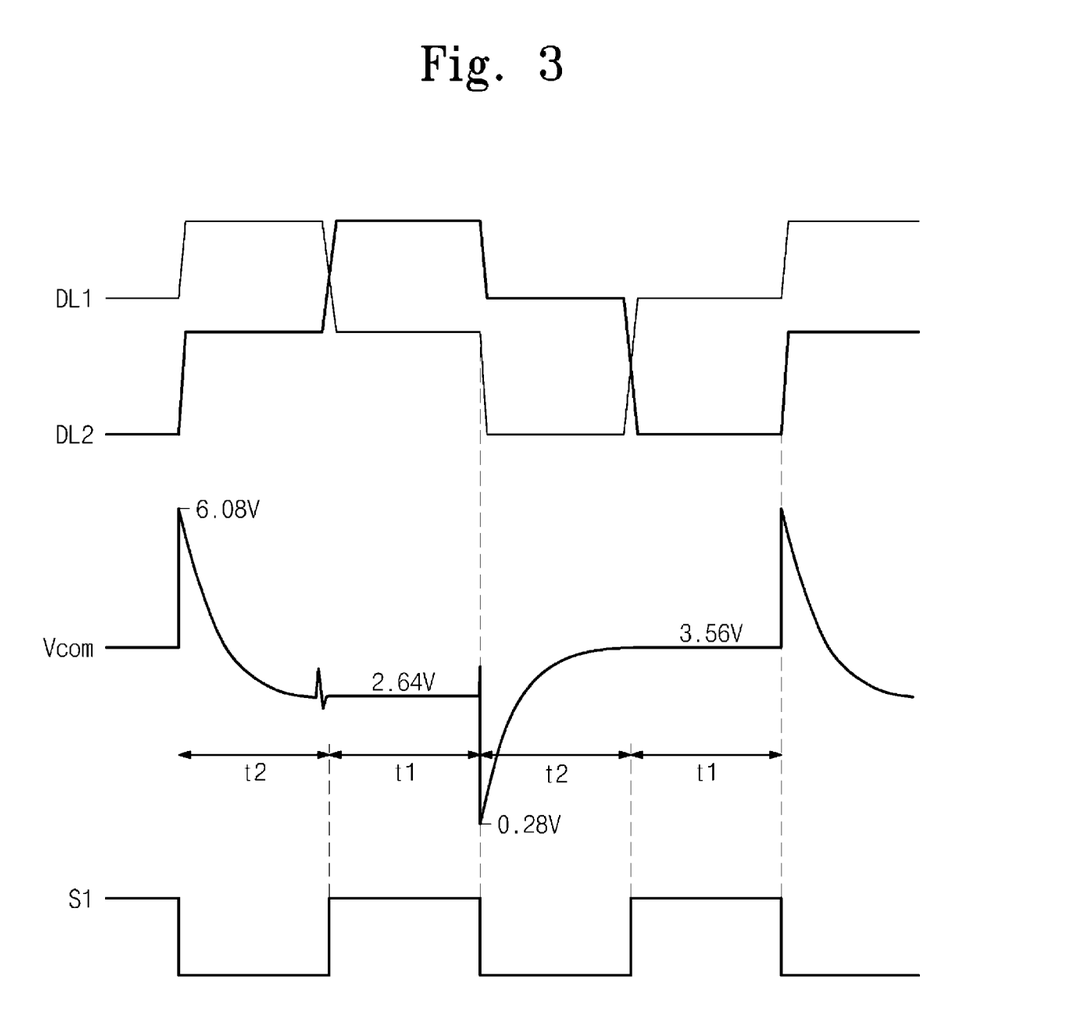
FIG. 3 shows waveform diagrams showing a first data signal output to a first data line, a second data signal output to a second data line, a common voltage, and a first switching signal.

FIG. 2 is a block diagram showing the exemplary first sensing driver of FIG. 1, and FIG. 3 shows waveform diagrams of a first data signal output to a first data line, a second data signal output to a second data line, the common voltage, and the first switching signal.

Referring to FIG. 2, the first sensing driver 230 includes a switching circuit 231, a level shifter 232, and a sensing signal generator 236, and the sensing signal generator 236 includes a comparator part 233, a readout part 234, and a shift register 235.

The switching circuit 231 includes a plurality of transistors ST1~STi respectively connected to the first sensing lines SL1-1~SL1-$i$ in a one-to-one correspondence relationship. Particularly, each of the transistors ST1~STi includes an input terminal, such as an input electrode, connected to a corresponding first sensing line SL1, a control terminal, such as a control electrode, receiving the first switching signal S1 from the level shifter 232, and an output terminal, such as an output electrode, connected to the sensing signal generator 236.

Each of the first sensing lines SL1-1~SL1-$i$ outputs the common voltage Vcom when a corresponding sensing electrode SE (shown in FIG. 1) makes contact with the common electrode, and outputs the reference voltage Vref input at the initial state from the first sensing driver 230 when the corresponding sensing electrode SE does not make contact with the common electrode. Therefore, each input terminal of the transistors ST1~STi may receive the common voltage Vcom or the reference voltage Vref from the corresponding first sensing line SL1.

As shown in FIG. 3, in an exemplary embodiment, the common voltage Vcom provided to the switching circuit 231 through the first sensing lines SL1-1~SL1-$i$ is maintained at a voltage level of about 2.64 volts or about 3.56 volts during the first period t1. During the first period t1, the common voltage Vcom may be considered to be in a range of a preset voltage level, such as a predetermined normal voltage level. However, the voltage level of the common voltage Vcom increases to about 6.08 volts or decreases to about 0.28 volts during the second period t2, and therefore during the second period t2, the common voltage Vcom may be considered to be out of the range of the preset voltage level, such as the predetermined normal voltage level. The change of the voltage level of the common voltage Vcom is caused by a change of the data signal applied to the data lines DL1~DLm. For instance, the voltage level of the common voltage Vcom increases to about 6.08 volts when the voltage level of the data signal applied to the first and second data lines DL1 and DL2 increases, and the voltage level of the common voltage Vcom decreases to about 0.28 volts when the voltage level of the data signal applied to the first and second data lines DL1 and DL2 decreases. That is, the voltage level of the common voltage Vcom is in a range from about 0.28 volts to about 6.08 volts due to the change of the data signal.

In an exemplary embodiment, the data driver IC 210 (shown in FIG. 1) in which the first sensing driver 230 is applied may employ a low-voltage transistor of about 3.3 volts. Thus, the low-voltage transistor is used for logic circuits included in the first sensing driver 230, as will be further described below.

In an exemplary embodiment, the transistors ST1~STi included in the switching circuit 231 include a high-voltage transistor. For example, the high voltage transistors ST1~STi may be capable of enduring a voltage level of about 10 volts to about 40 volts in order to endure the common voltage Vcom having the voltage level of about 0.28 volts to about 6.08 volts. Accordingly, even when the common voltage Vcom having an abnormal voltage level is applied through the first sensing lines SL1-1~SL1-I, the transistors ST1~STi may be prevented from being damaged.

The first switching signal S1 applied to the switching circuit 231 is maintained at a high state during the first period t1 and is maintained at a low state during the second period t2. Thus, each of the transistors ST1~STi outputs the common voltage Vcom provided from a corresponding first sensing line SL1-1~SL1-i during the first period t1 in response to the first switching signal S1 and blocks the common voltage Vcom having the abnormal voltage level so as not to be applied to the sensing signal generator 236 during the second period t2. Consequently, the switching circuit 231 may prevent the sensing signal generator 236 configured to have the low voltage transistor from being damaged by the common voltage Vcom that momentarily increases to the abnormal high voltage level.

Referring again to FIG. 2, the level shifter 232 receives the first switching signal S1 from the controller 300 (shown in FIG. 1) and boosts the first switching signal S1 to provide the switching signal S1 to the control terminals of the transistors ST1~STi in the switching circuit 231. The level shifter 232 boosts the voltage level of the first switching signal S1 to a predetermined level in order to control an on/off of the transistors ST1~STi arranged in the switching circuit 231.

The comparator part 233 of the sensing signal generator 236 includes a plurality of comparators COM1~COMi respectively connected to the transistors ST1~STi of the switching circuit 231 in a one-to-one correspondence relationship. Each of the comparators COM1~COMi includes a first input terminal connected to an output terminal of a corresponding transistor ST1~STi and a second input terminal through which the reference voltage Vref is input. The reference voltage Vref may always be applied to the second input terminal, while the common voltage Vcom or the reference voltage Vref is applied to the first input terminal according to whether the sensing electrodes SE make contact with the common electrode or not.

Each comparator COM1~COMi compares a signal input through the first input terminal with the reference voltage Vref input through the second input terminal, and outputs either a ground voltage VSS or a driving voltage VDD according to the compared result. More specifically, each comparator COM1~COMi outputs the ground voltage VSS when the reference voltage Vref is applied to the first input terminal, and outputs the driving voltage VDD when the common voltage Vcom is applied to the first input terminal.

The readout part 234 of the sensing signal generator 236 switches a signal output from the comparator part 233 in response to the first readout signal RO1 provided from the controller 300. Particularly, the readout part 234 stores the signal output from the comparator 233 and provides the stored signal to the shift register 235 when the first readout signal RO1 is generated as a logic high level.

The shift register 235 includes a plurality of stages SR1~SRi respectively corresponding to the comparators COM1~COMi in a one-to-one correspondence relationship. Thus, each stage SR1~SRi receives the ground voltage VSS or the driving voltage VDD from a corresponding comparator COM among the comparators COM1~COMi in the comparator part 233. A stage SR that receives the driving voltage VDD among the stages SR1~SRi is turned on, and a stage SR that receives the ground voltage VSS among the stages SR1~SRi is turned off. The turned-on stage SR outputs the first sensing signal SS1 corresponding to the x-axis coordinate value with respect to the position where the sensing electrode SE makes contact with the common electrode. Then, the first sensing signal SS1 output from the turned-on stage SR is provided to the controller 300.

Although the second sensing driver 240 (shown in FIG. 1) has not been described in detail, since the second sensing driver 240 has the same circuit configuration or substantially the same circuit configuration as that of the first sensing driver 230, it should be understood that the second sensing driver 240 outputs the second sensing signal SS2 corresponding to the y-axis coordinate value with respect to the position where the sensing electrode SE makes contact with the common electrode. A switching circuit of the second sensing driver 240 receives the second switching signal S2 and a readout part of a sensing signal generator of the second sensing driver 240 receives the second readout signal RO2, in a similar manner as the above-described first sensing driver 230.

Thus, the controller 300 may accurately calculate the position where the sensing electrode SE makes contact with the common electrode based on the first and second sensing signals SS1 and SS2, and control a drive of the gate driver IC 210 and the data driver IC 220 in order to perform their operations corresponding to the contact position.

Figure 4:
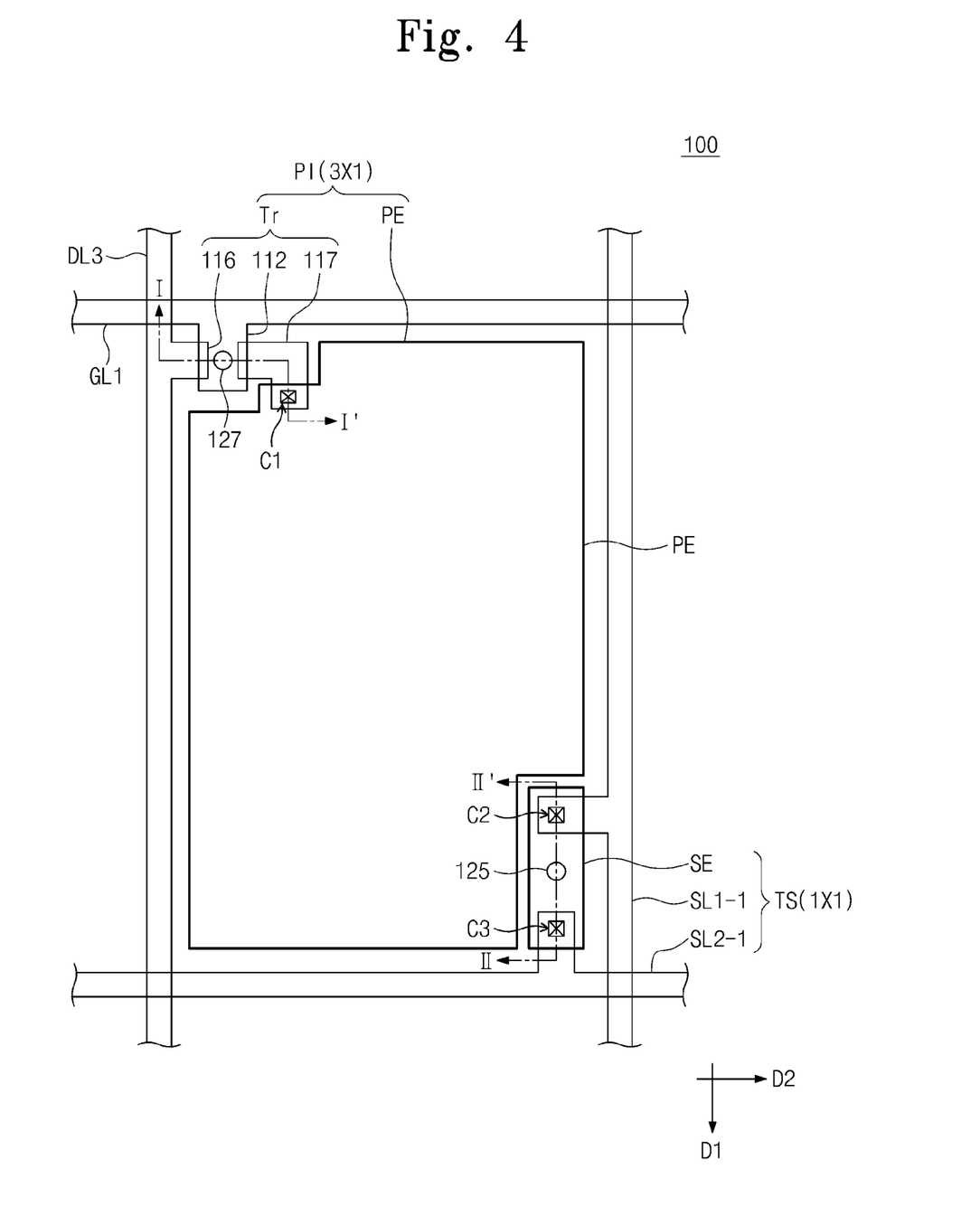
FIG. 4 is a plan view showing an exemplary pixel and an exemplary touch sensor of FIG. 1.
Figure 5:
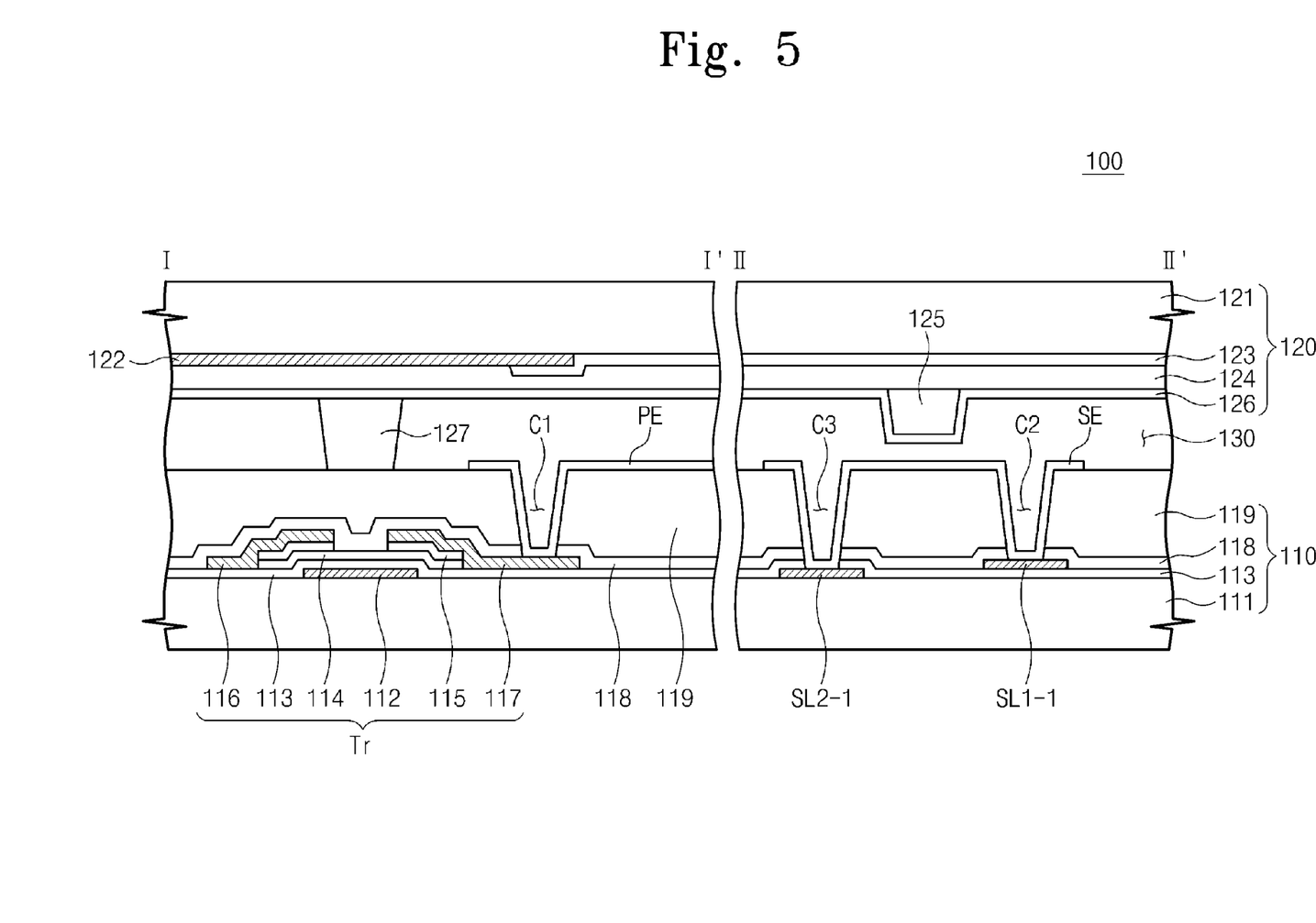
FIG. 5 is a sectional view taken along lines I-I' and II-II' of FIG. 4.

FIG. 4 is a plan view showing an exemplary pixel and exemplary touch sensor of FIG. 1, and FIG. 5 is a sectional view taken along lines I-I' and II-II' of FIG. 4.

The display panel 100 includes the pixels PI and the touch sensors TS, however, since each of the pixels PI may have the same circuit configuration and each the touch sensors TS may have the same circuit configuration, in the present exemplary embodiment, a plan view and a sectional structure of one pixel (e.g. PI(3×1)) and one touch sensor (e.g. TS(1×1)) will be described in detail with reference to FIGS. 4 and 5, and thus detailed descriptions of remaining pixels PI and touch sensors TS will be omitted to avoid redundancy.

Referring to FIGS. 4 and 5, the display panel 100 includes an array substrate 110, an opposite substrate 120 facing the array substrate 110, and a liquid crystal layer 130 interposed between the array substrate 110 and the opposite substrate 120.

The array substrate 110 includes a first base substrate 111, and the pixel PI(3×1) and the touch sensor TS(1×1) are arranged on the first base substrate 111. The pixel PI(3×1)

includes the third data line DL3, the first gate line GL1, the TFT Tr, and the pixel electrode PE.

More specifically, the third data line DL3 is extended in a first direction D1, and the first gate line GL1 is extended in a second direction D2 that is substantially perpendicular to the first direction D1 to be intersected with and insulated from the third data line DL3. The TFT Tr includes a gate electrode 112 branched from the first gate line GL1, a source electrode 116 branched from the third data line DL3, and a drain electrode 117 electrically connected to the pixel electrode PE and spaced apart from the source electrode 116 by a predetermined distance. The gate electrode 112 serves as a control terminal of the TFT Tr receiving the gate signal from the first gate line GL1, the source electrode 116 serves as an input terminal of the TFT Tr receiving the data signal from the third data line DL3, and the drain electrode 117 serves as an output terminal of the TFT Tr outputting the data signal to the pixel electrode PE.

Meanwhile, the touch sensor TS(1×1) includes the first sensing line SL1-1, the second sensing line SL2-1, and the sensing electrode SE. The first sensing line SL1-1 is extended in the first direction D1 parallel to the third data line DL3, and the second sensing line SL2-1 is extended in the second direction D2 parallel to the first gate line GL1 to be intersected with and insulated from the first sensing line SL1-1. The sensing electrode SE is spaced apart from the pixel electrode PE by a predetermined distance to be insulated from the pixel electrode PE, and the sensing electrode SE is electrically connected to the first and second sensing lines SL1-1 and SL2-1.

As shown in FIG. 5, the gate electrode 112 and the second sensing line SL2-1 including a gate metal are formed on the first base substrate 111. The first gate line GL1 is further formed on the first base substrate 111. The gate electrode 112 is branched from first gate line GL1 (see FIG. 4) and receives the gate signal from the first gate line GL1 in order to drive the TFT Tr. A gate insulating layer 113 is formed on the gate electrode 112 in order to cover the gate electrode 112 and the second sensing line SL2-1. The gate insulating layer 113 may further cover the first gate line GL1 and exposed portions of the first base substrate 111. An active layer 114 and an ohmic contact layer 115 are sequentially formed on the gate insulating layer 113 corresponding to a region in which the gate electrode 112 is formed. Then, the source electrode 116 and the drain electrode 117 that include a data metal are formed in order to cover the ohmic contact layer 115. The third data line DL3 is formed in a same layer of the array substrate 110 as the source electrode 116 and the drain electrode 117. The source electrode 116 and the drain electrode 117 are spaced apart from each other by the predetermined distance above the gate electrode 112. Accordingly, the TFT Tr is completed on the first base substrate 111. The source electrode 116 is branched from the third data line DL3 (see FIG. 4) and receives the data signal from the third data line DL3. The drain electrode 117 receives the data signal from the source electrode 116 via the active layer 114 when the gate signal is applied to the TFT Tr.

Meanwhile, the first sensing line SL1-1 including the data metal is formed with the source electrode 116 and the drain electrode 117 on the gate insulating layer 113. In other words, the first sensing line SL1-1 is formed in a same layer of the array substrate 110 as the source electrode 116, the drain electrode 117, and the third data line DL3.

The TFT Tr and the first sensing line SL1-1 are covered by a protective layer 118 including an inorganic insulating layer, and an organic insulating layer 119 is formed on the protective layer 118. The protective layer 118 and the organic insulating layer 119 are provided with a first contact hole C1, a second contact hole C2, and a third contact hole C3 that are formed therethrough by a patterning process. Particularly, the first contact hole C1 exposes the drain electrode 117 of the TFT Tr, the second contact hole C2 exposes the first sensing line SL1-1, and the third contact hole C3 exposes the second sensing line SL2-1. The first contact hole C1 and the second contact hole C2 are formed through the protective layer 118 and the organic insulating layer 119, while the third contact hole C3 is formed through the protective layer 118, the organic insulating layer 119, and the gate insulating layer 113.

The pixel electrode PE and the sensing electrode SE are formed on the organic insulating layer 119. The pixel electrode PE is electrically connected to the drain electrode 117 of the TFT Tr through the first contact hole C1. The sensing electrode SE is electrically connected to the first and second sensing lines SL1-1 and SL2-1 through the second and third contact holes C2 and C3, respectively. Thus, the array substrate 110 is completed.

The opposite substrate 120 includes a second base substrate 121, a black matrix 122, a color filter layer 123, an overcoat layer 124, a protruding portion 125, a common electrode 126, and a spacer 127. The second base substrate 121 faces the first base substrate 111, and the black matrix 122 is formed on the second base substrate 121 corresponding to a non-effective display area, such as an area in which the TFT Tr is formed. The color filter layer 123 is partially overlapped with the black matrix 122 and formed in an area corresponding to an effective display area of the array substrate 110. The overcoat layer 124 is formed on the black matrix 122 and the color filter layer 123 with a predetermined thickness, so that the overcoat layer 124 has a flat surface regardless of a step difference between the black matrix 122 and the color filter layer 123.

The protruding portion 125, which may include an insulating material, is formed on the overcoat layer 124 corresponding to a region in which the sensing electrode SE is formed on the array substrate 110. The common electrode 126 is formed on the overcoat layer 124 and the protruding portion 125 with a uniform thickness. The protruding portion 125 has a height smaller than a distance between the sensing electrode SE and the overcoat layer 124 so that the sensing electrode SE and the common electrode 126 do not make contact with each other when the external pressure is not provided to the display panel 100.

In order to uniformly maintain a distance between the array substrate 110 and the opposite substrate 120, a spacer 127 is arranged on the common electrode 126. The spacer 127 may have substantially the same height as a distance between the common electrode 126 and the organic insulating layer 119. In an exemplary embodiment, the spacer 127 is arranged in the non-effective display area to prevent the aperture ratio of the display panel 100 from decreasing, such as the area corresponding to the area in which the TFT Tr is formed. In an alternative exemplary embodiment, the spacer 127 may be formed on the array substrate 110.

The liquid crystal layer 130 is interposed in a space defined by the spacer 127 between the array substrate 110 and the opposite substrate 120.

Figure 6:
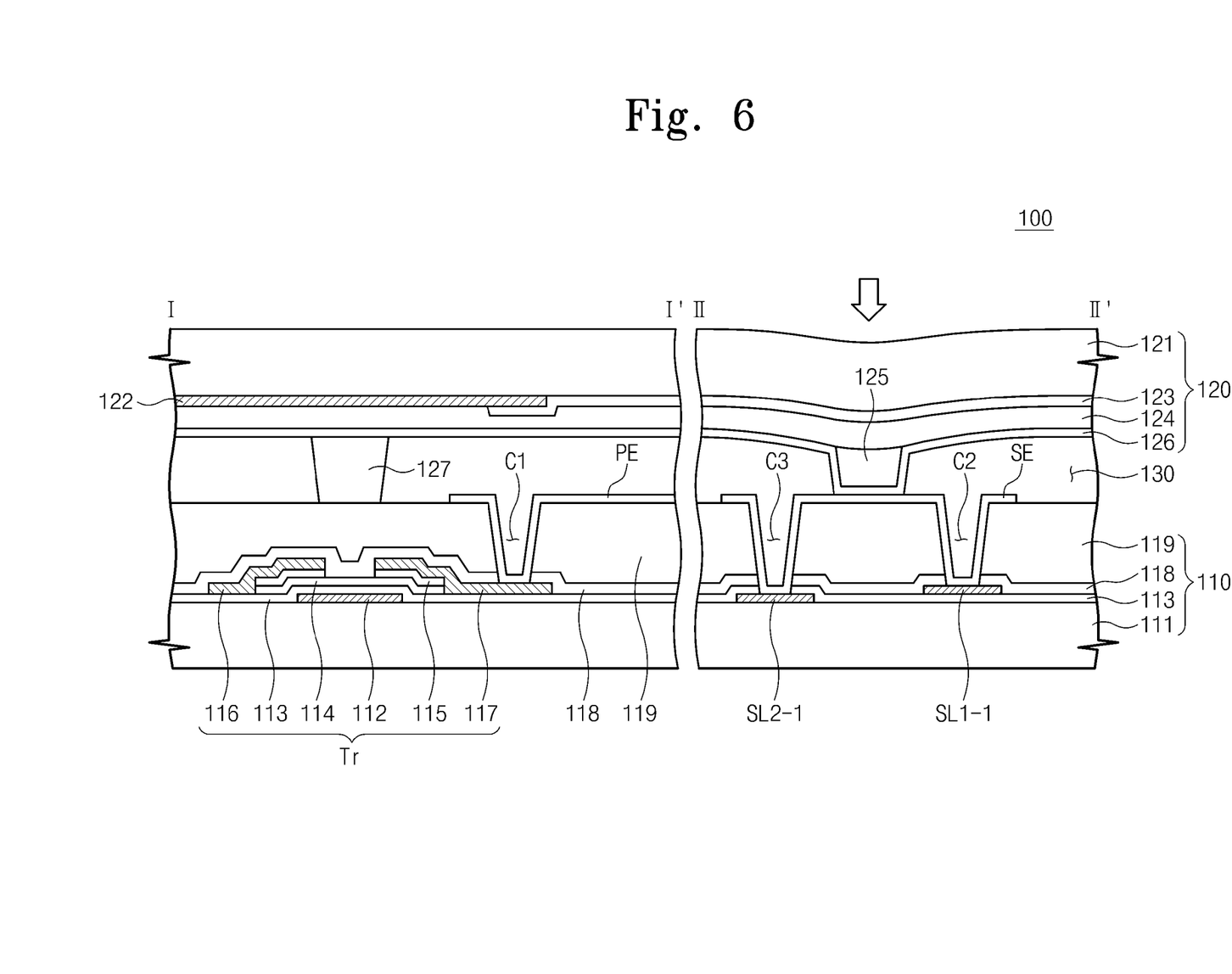
FIG. 6 is a sectional view showing a contact state between an exemplary common electrode and an exemplary sensing electrode by an external pressure.

FIG. 6 is a cross-sectional view showing a contact state between the exemplary common electrode and the exemplary sensing electrode by the external pressure.

Referring to FIG. 6, when the distance between the array substrate 110 and the opposite substrate 120 becomes narrower by the external pressure at a region to which the external pressure is applied as indicated by the arrow, the common electrode 126 arranged on the protruding portion 125 makes contact with the sensing electrode SE that faces the common electrode 126. In other words, the common electrode 126 and the sensing electrode SE are electrically connected to each other by the external pressure, and the common voltage Vcom applied to the common electrode 126 is provided to the sensing electrode SE.

The sensing electrode SE is electrically connected to the first and second sensing lines SL1-1 and SL2-1 through the second and third contact holes C2 and C3, so that the common voltage Vcom provided to the sensing electrode SE may be applied to the first and second sensing drivers 230 and 240 (shown in FIG. 1) through the first and second sensing lines SL1-1 and SL2-1, respectively.

Since the first and second sensing drivers 230 and 240 have been described in detail with reference to FIGS. 1 and 2, a process that calculates the position information to which the external pressure is applied using the common voltage Vcom will be omitted.

According to the above-described display apparatus, the display panel includes touch sensors that make contact with the common electrode by the external pressure to output the common voltage, and the sensing driver includes the switching circuit that receives the switching signal from the controller to switch the common voltage provided from the touch sensors.

Thus, the sensing driver may prevent the input of the common voltage during the period where the voltage level of the common voltage is abnormally high, thereby preventing the logic circuit of the sensing driver configured to have the low-voltage transistors from being damaged.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A display apparatus comprising:
a display panel including a common electrode receiving a common voltage, pixels facing the common electrode and displaying an image in response to driving signals, and touch sensors arranged adjacent to the pixels and making contact with the common electrode by an external pressure to output the common voltage;
a pixel driver electrically connected to the pixels to provide the driving signals to the pixels;
a sensing driver electrically connected to the touch sensors to receive the common voltage from the touch sensors and generate a sensing signal based on the common voltage; and
a controller which controls a drive of the pixel driver, receives the sensing signal from the sensing driver, and outputs a position information to which the external pressure is applied based on the sensing signal, and the sensing driver comprising:
a switching circuit which receives a switching signal from the controller, outputs the common voltage during a first period where the common voltage is in a normal operation range and blocks the common voltage during a second period where the common voltage is out of the normal operation range, so that the common voltage is selectively output to prevent a damage of the sensing driver; and
a sensing signal generating circuit which generates the sensing signal based on the common voltage output from the switching circuit.

2. The display apparatus of claim 1, wherein each touch sensor comprises:
a sensing electrode making contact with the common electrode by the external pressure to receive the common voltage from the common electrode; and
a sensing line receiving the common voltage from the sensing electrode to provide the common voltage to the sensing driver.

3. The display apparatus of claim 2, wherein the switching signal is maintained at a high state during the first period, and the switching signal is maintained at a low state during the second period.

4. The display apparatus of claim 3, wherein the switching circuit comprises a transistor including an input terminal connected to the sensing line to receive the common voltage, a control terminal receiving the switching signal, and an output terminal outputting the common voltage to the sensing signal generating circuit.

5. The display apparatus of claim 2, wherein the sensing driver further comprises a level shifter that boosts the switching signal from the controller and provides the switching signal that has been boosted to the switching circuit.

6. The display apparatus of claim 1, wherein each pixel comprises:
a gate line that receives a gate signal among the driving signals;
a data line that intersects with the gate line and receives a data signal among the driving signals;
a thin film transistor electrically connected to the gate line and the data line to output the data signal in response to the gate signal; and
a pixel electrode connected to an output electrode of the thin film transistor to receive the data signal and facing the common electrode.

7. The display apparatus of claim 6, wherein each touch sensor comprises:
a sensing electrode making contact with the common electrode by the external pressure to receive the common voltage from the common electrode;
a first sensing line arranged in parallel with the data line and which receives the common voltage from the sensing electrode; and
a second sensing line arranged in parallel with the gate line and which receives the common voltage from the sensing electrode.

8. The display apparatus of claim 7, wherein the sensing driver comprises:
a first sensing driver receiving the common voltage from the first sensing line to output a first sensing signal; and
a second sensing driver receiving the common voltage from the second sensing line to output a second sensing signal.

9. The display apparatus of claim 8, wherein the pixel driver comprises:
a gate driver providing the gate signal to the gate line; and
a data driver providing the data signal to the data line.

10. The display apparatus of claim 9, wherein the gate driver and the second sensing driver are installed inside a gate driver integrated circuit, and the data driver and the first sensing driver are installed inside a data driver integrated circuit.

11. The display apparatus of claim 10, wherein the gate driver integrated circuit is mounted on the display panel and electrically connected to the gate line and the second sensing line, and the data driver integrated circuit is mounted on the display panel and electrically connected to the data line and the first sensing line.

12. The display apparatus of claim 1, wherein each touch sensor is arranged at every N pixels, where N is a natural number.

13. The display apparatus of claim 1, wherein the display panel comprises:
   an array substrate;
   an opposite substrate facing the array substrate; and
   a liquid crystal layer interposed between the array substrate and the opposite substrate.

14. The display apparatus of claim 13, wherein the array substrate comprises a first base substrate, the pixels arranged on the first base substrate, and the touch sensors arranged on the first base substrate, and the opposite substrate comprises a second base substrate which faces the first base substrate, a protruding portion arranged on the second base substrate corresponding to the touch sensors, and the common electrode covers the protruding portion and the second base substrate.

15. The display apparatus of claim 1, wherein transistors within the switching circuit are enabled to endure a greater voltage level than transistors within the sensing signal generating circuit.

16. A method of driving a display apparatus, the method comprising:
   displaying an image in response to a gate signal and a data signal;
   outputting a common voltage by a pressure provided from an exterior;
   switching the common voltage in response to a switching signal;
   calculating a position information to which the pressure is applied based on the common voltage in response to the switching signal; and
   controlling the gate signal and the data signal to perform an operation corresponding to the position information,
   wherein switching the common voltage includes outputting the common voltage during a first period where the common voltage is in a normal operation range and blocking the common voltage during a second period where the common voltage is out of the normal operation range to prevent a damage of the sensing driver.

17. A sensing driver of a display apparatus, the sensing driver arranged to be electrically connected to touch sensors of the display apparatus and to receive a common voltage from the touch sensors, the sensing driver comprising:
   a switching circuit including transistors which receive a switching signal to selectively output the common voltage; and
   a sensing signal generating circuit including transistors which generate a sensing signal based on the common voltage output from the switching circuit;
   wherein the transistors within the switching circuit are enabled to endure a greater voltage level than the transistors within the sensing signal generating circuit, and the transistor output the common voltage during a first period where the common voltage is in a normal operation range and blocks the common voltage during a second period where the common voltage is out of the normal operation range to prevent the transistors of the sensing signal generator from damage.

* * * * *